United States Patent
Eisenhardt et al.

(10) Patent No.: US 10,698,219 B1
(45) Date of Patent: Jun. 30, 2020

(54) HEADS UP DISPLAY SYSTEMS FOR SWIMMING GOGGLES

(71) Applicant: Form Athletica Inc., Vancouver (CA)

(72) Inventors: Dan Eisenhardt, Vancouver (CA); Adam Capelin, Windsor (AU); Reynald Hoskinson, Vancouver (CA)

(73) Assignee: Form Athletica Inc., Vancouver (CA)

( * ) Notice: Subject to any disclaimer, the term of this patent is extended or adjusted under 35 U.S.C. 154(b) by 156 days.

(21) Appl. No.: 15/960,436

(22) Filed: Apr. 23, 2018

Related U.S. Application Data

(60) Provisional application No. 62/488,516, filed on Apr. 21, 2017.

(51) Int. Cl.
*G02B 27/01* (2006.01)
*A63B 33/00* (2006.01)
(Continued)

(52) U.S. Cl.
CPC ...... *G02B 27/0172* (2013.01); *A63B 24/0006* (2013.01); *A63B 24/0021* (2013.01); *A63B 24/0062* (2013.01); *A63B 33/002* (2013.01); *A63B 71/0622* (2013.01); *G02B 27/0176* (2013.01); *A63B 2024/0015* (2013.01);
(Continued)

(58) Field of Classification Search
CPC ............ G02B 27/0172; G02B 27/0176; G02B 2027/0143; G02B 2027/014; G02B 2027/0141; A63B 24/0006; A63B 71/0622; A63B 24/0021; A63B 24/0062; A63B 33/002; A63B 2071/0694; A63B 2220/12; A63B 2220/20; A63B 2220/40; A63B 2208/03; A63B 2225/50; A63B 2033/004; A63B 2225/60; A63B 2024/0015; A63B 2220/62; A63B 2071/0666; A63B 2024/0025
See application file for complete search history.

(56) References Cited

U.S. PATENT DOCUMENTS 9,778,622 B2 * 10/2017 Firmin ................... G01B 11/14
2005/0225867 A1 * 10/2005 Ishibashi ............ G02B 27/0176
359/630
(Continued)

FOREIGN PATENT DOCUMENTS

WO 2015/164944 A1 11/2015

*Primary Examiner* — Jade R Chwasz
(74) *Attorney, Agent, or Firm* — Kolitch Romano LLP

(57) ABSTRACT

The present disclosure provides a heads up display (HUD) system configured for use with a pair of swimming goggles comprising first and second eye cups, a nose bridge connected to inner sides of the eye cups, and strap mounting portions on outer sides of the eye cups. The HUD system comprises an electronics and optics modules. The electronics module comprises a water tight housing and a processor, memory, power supply, sensors and a display within the water tight housing. The processor processes signals from the sensors to determine swimming performance data and controls the display to generate an image containing the swimming performance data. The optics module is mounted on one of the eye cups and is coupled to the electronics module for receiving the image from the display. The optics module extends from the electronics module and has one or more light directing features for redirecting the image toward an eye of a user to generate a redirected image.

17 Claims, 7 Drawing Sheets

(51) Int. Cl.
*A63B 71/06* (2006.01)
*A63B 24/00* (2006.01)

(52) U.S. Cl.
CPC . *A63B 2024/0025* (2013.01); *A63B 2033/004* (2013.01); *A63B 2071/0666* (2013.01); *A63B 2071/0694* (2013.01); *A63B 2208/03* (2013.01); *A63B 2220/12* (2013.01); *A63B 2220/20* (2013.01); *A63B 2220/40* (2013.01); *A63B 2220/62* (2013.01); *A63B 2225/50* (2013.01); *A63B 2225/60* (2013.01); *G02B 2027/014* (2013.01); *G02B 2027/0141* (2013.01); *G02B 2027/0143* (2013.01)

(56) References Cited

U.S. PATENT DOCUMENTS

| | | | |
|---|---|---|---|
| 2008/0018532 A1* | 1/2008 | Mackintosh | A63B 24/0021 342/357.57 |
| 2010/0030482 A1 | 2/2010 | Li | |
| 2010/0134297 A1 | 6/2010 | Baldwin | |
| 2013/0187786 A1 | 7/2013 | Dadlani Mahtani et al. | |

* cited by examiner

US 10,698,219 B1

HEADS UP DISPLAY SYSTEMS FOR SWIMMING GOGGLES

CROSS REFERENCE TO RELATED APPLICATION

This application claims the benefit of priority of U.S. Provisional Patent Application No. 62/488,516, which was filed on Apr. 21, 2017 and is hereby incorporated herein by reference in its entirety.

TECHNICAL FIELD

The present disclosure relates to heads up display (HUD) systems, and in particular to HUD systems for use with swimming goggles.

BACKGROUND

The advent of small, low power, and reliable electronic sensors, processors and related components has led to an increase in the practicality and popularity of wearable computing devices. Various wearable computing devices for use by swimmers have been proposed, including:

US Patent Application Publication No. 2010/0030482;
US Patent Application Publication No. 2010/0134297;
US Patent Application Publication No. 2013/0187786; and
International (PCT) Application Publication No. WO 2015/164944.

The inventors have determined a need for improved systems and methods for providing swimmers with real time information while swimming.

SUMMARY

One aspect provides a heads up display (HUD) system configured for use with a pair of swimming goggles comprising first and second eye cups, a nose bridge connected to an inner side of each of the first and second eye cups, and a strap mounting portion on an outer side of each of the first and second eye cups. The HUD system comprises an electronics module and an optics module. The electronics module comprises a water tight housing and a processor, memory, power supply, one or more sensors and a display within the water tight housing. The processor processes signals from the one or more sensors to determine swimming performance data and controls the display to generate an image containing the swimming performance data. The optics module is mounted on one of the first and second eye cups and is coupled to the electronics module for receiving the image from the display. The optics module extends from the electronics module and has one or more light directing features for redirecting the image toward an eye of a user to generate a redirected image.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

Figure 1:
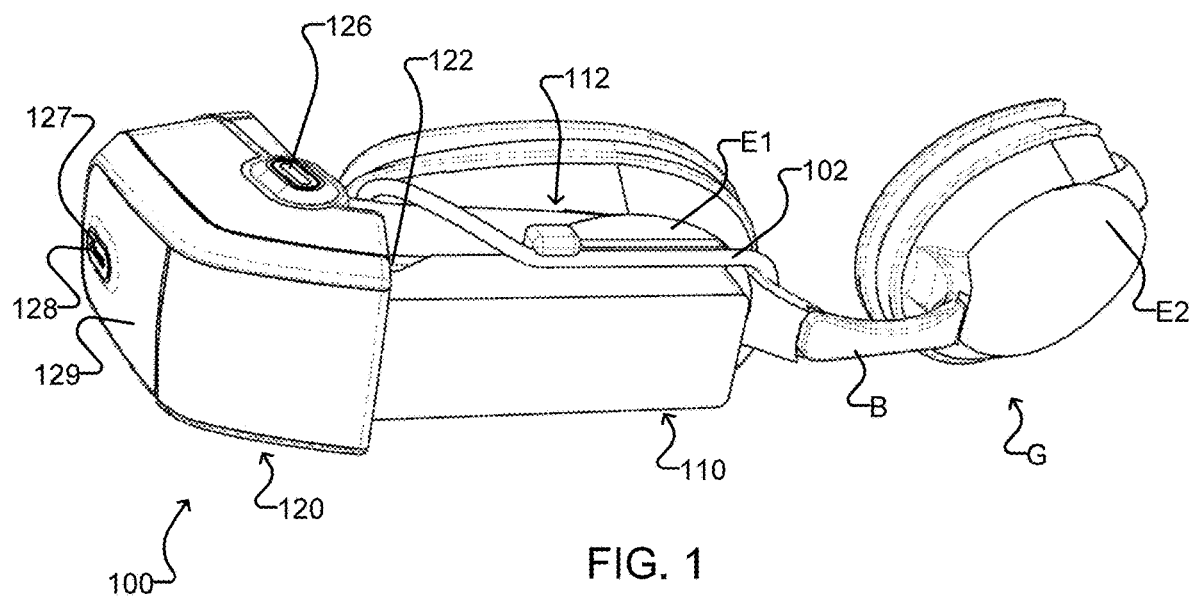
FIG. 1 shows a pair of swimming goggles with a heads up display (HUD) system removeably mounted thereon.

The following describes heads up display (HUD) systems for use with swimming goggles. Example embodiments described below include HUD systems adapted to be removaebly mounted on a pair of swimming goggles, and HUD systems integrated into a pair of swimming goggles. The HUD systems disclosed herein are useful for providing a near-eye data feed to swimmers in real time, who otherwise would be isolated from information during activity. The data feed provides critical data about the swimming activity such as for example time, splits, lap count, distance and breathing rate but can also include text notifications to the swimmer for technique tips (e.g. body or head position), encouraging messages to boost motivation, or messages from the coach, as described further below.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows a pair of swimming goggles G with a heads up display (HUD) system 100 removably mounted thereon. The goggles G have a pair of eye cups E1 and E2 with a nose bridge B connected between an inner side of each of the eye cups E1 and E2. Each of the eye cups E1 and E2 has a strap mounting portion S on its outer side.

The HUD system 100 comprises an optics module 110 and an electronics module 120, and a resilient loop member 102 configured to secure the HUD system 100 to one of the eye cups E1 or E2. As discussed further below, the electronics module 120 generates an image containing swimming performance data which is directed toward a user's eye by the optics module 110.

The optics module 110 comprises a transparent member 111 extending from the electronics module 120. The transparent member 111 has a viewing surface 119 configured for placement against the front side of one of the eye cups E1 or E2. The optics module 110 is held in place against the goggle eye cup E1/E2 by a resilient loop member 102 stretched between the bridge B and mounting portion S and over protrusions 112 on the transparent member 111.

Figure 1A:
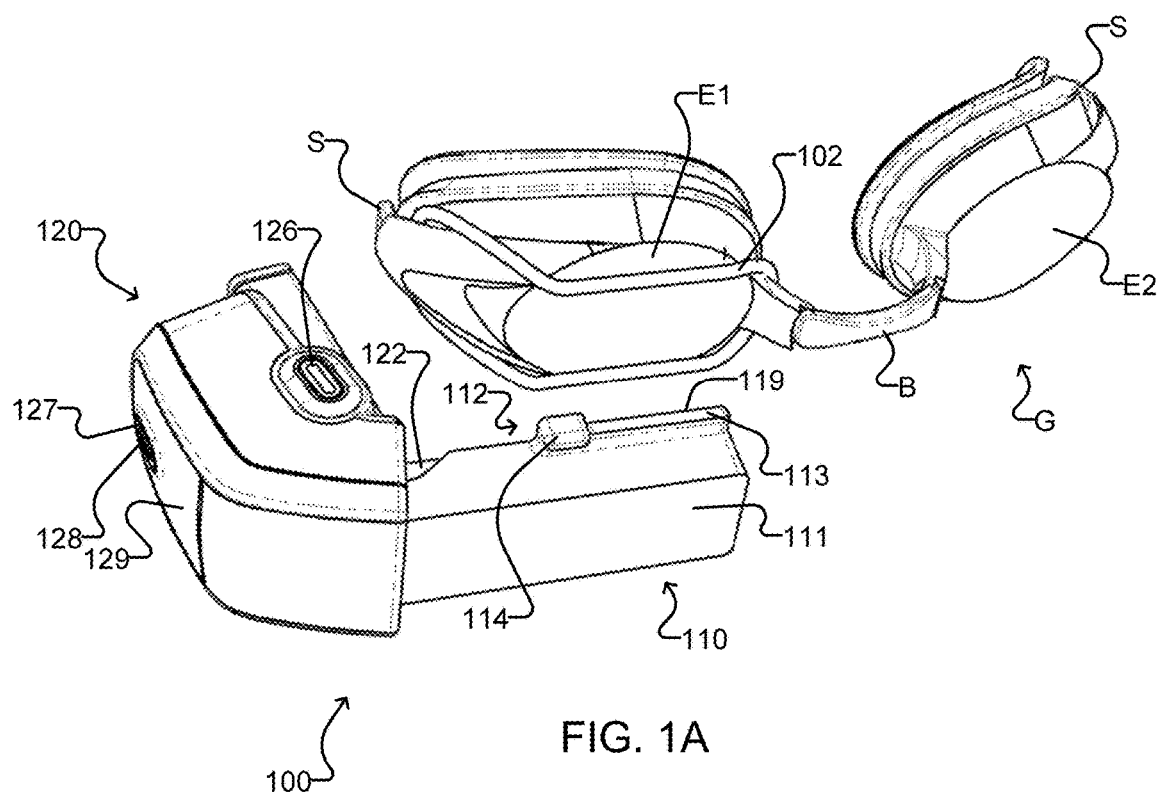
FIG. 1A shows the swimming goggles and HUD system of FIG. 1 with the HUD system removed from the goggles.

In the illustrated example embodiment, the protrusions 112 are symmetrically positioned on the top and bottom of the transparent member. Each of the top and bottom protrusions 112 comprises a flange 113 extending outwardly from the edge of the transparent member 111 adjacent to the viewing surface 119, and a hook 114 at an end of the flange 113 closest to the electronics module 120. This configuration allows the viewing surface 119 to be securely held against the front surface of the eye cup E1/E2 by a single loop member 102 looped around the bridge B and mounting portion S, as shown in FIG. 1A, by stretching the loop member 102 for placement over the flanges 113 and hooks 114 on the top and bottom of the transparent member 111. To account for different sized goggles, the unstretched size of the loop member 102 may be selected based on the distance between the bridge B and mounting portion S to ensure that the transparent member 111 is held securely.

In other embodiments, the protrusions 112 may take different forms. For example, in some embodiments the flanges 113 could be replaced with another pair of hooks or the like near the end of the optics module. In some embodiments one loop may be provided for attaching to the strap around hooks near the electronics module, and another loop for attaching to the bridge around a hook on the end of the optics module.

The electronics module 120 comprises an electronic system having a processor and a plurality or sensors for generating signals indicative of swimming performance data, and a display device for sending light signals to the optics module 110, as described further below. The electronics module 120 comprises an optical module interface 122 for coupling light from the display device within the electronics module 120 into the optics module 110. The optics module 110 comprises light directing elements within the transparent member 111 for directing light towards the viewing surface 119. For example, in some embodiments, the optics module comprises a holographic waveguide (e.g. a transparent substrate such as a glass plate or the like, with a first hologram for receiving an image from the display and redirecting light to a second hologram which redirects light towards the viewing surface 119), and the light directing elements may comprise holographic beam splitters. The holographic waveguide may be located within a cavity defined in the transparent member, with spacings around the waveguide to leave gaps for maintaining total internal reflection, as described below.

Figure 1B:
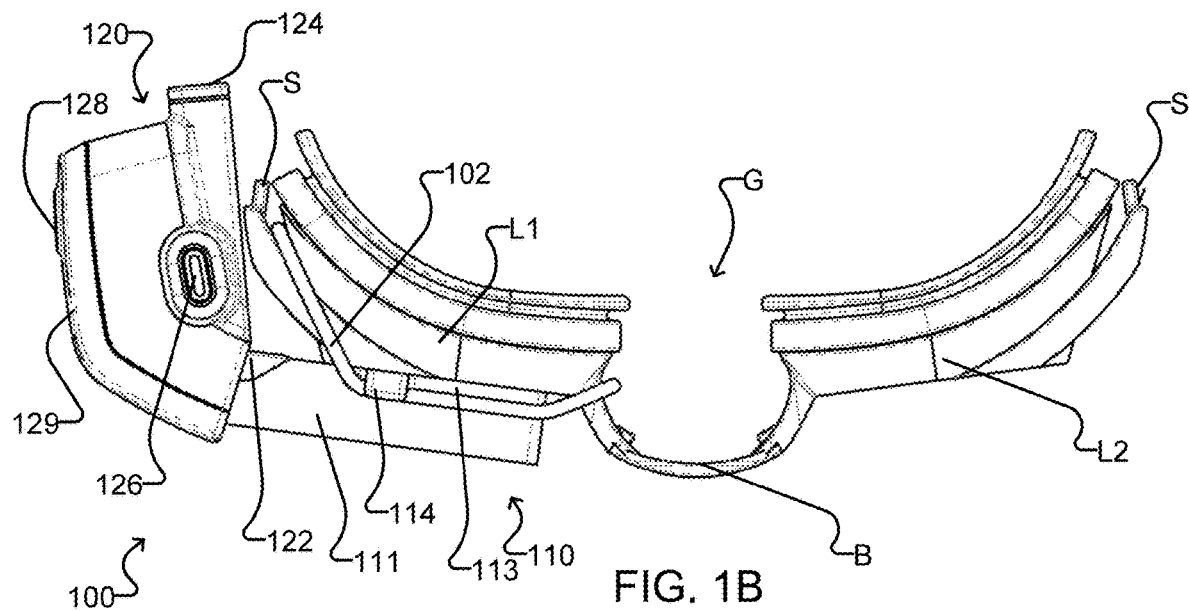
FIG. 1B is a top view of the swimming goggles and HUD system of FIG. 1.
Figure 1C:
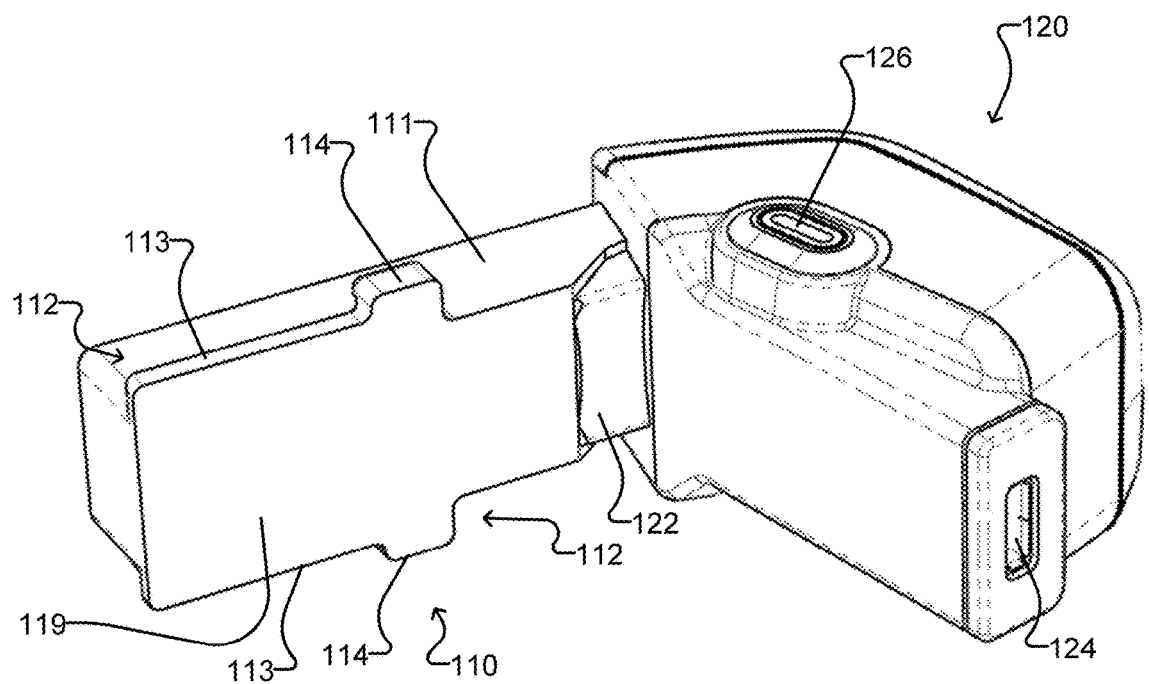
FIG. 1C shows the HUD system of FIG. 1 in isolation.

As best seen in FIGS. 1B and 1C, the electronics module 120 also comprises a port 124, such as for example a micro-USB port. In some embodiments, the port 124 comprises an IP68 10 m waterproof Micro-USB connector. This Micro-USB connector is sealed through the body of the connector and has a rubber seal around the outside that seals with a mating port in the housing of the electronics module 120. As an alternative to a waterproof micro-USB connector, the port 124 may, for example, comprise pogo-pin contacts embedded in the wall of the housing of the electronics module 120, and a custom USB cable may be provided for connecting to the pogo-pin contacts. The port 124 allows the HUD system 100 to be connected to a power source for charging the battery, and/or connected to another electronic device for wired data transfer. In other embodiments, the HUD system 100 comprises a wireless charging receiver such that the battery may be charged wirelessly. The electronics module 120 may also comprise one or more user interface elements, which in the illustrated example include a power button 126, a wireless activation button 128, and a touch sensitive region 129. The electronics module 120 may also comprise an ambient light sensor 127 for detecting ambient lighting conditions.

Figure 2:
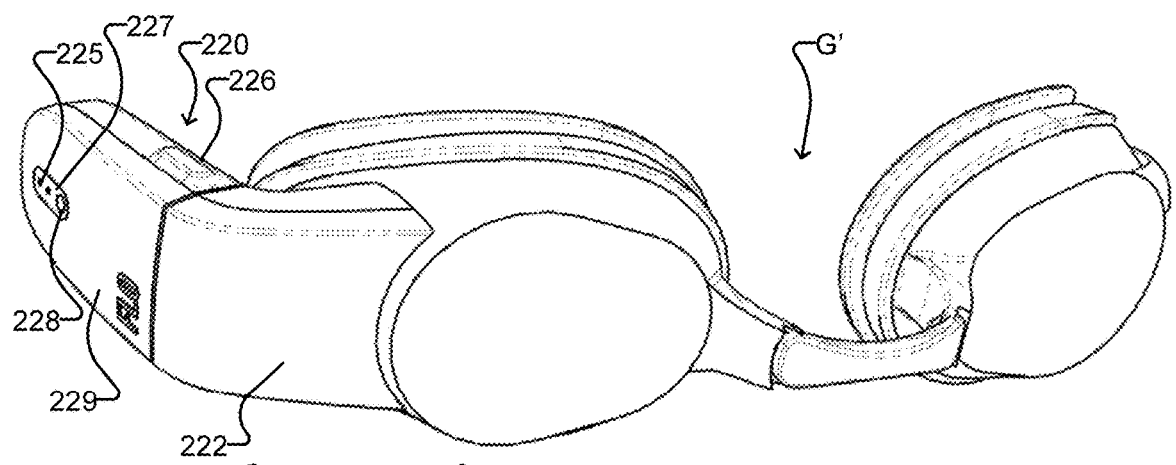
FIG. 2 shows a pair of swimming goggles with an integrated HUD system.
Figure 2A:
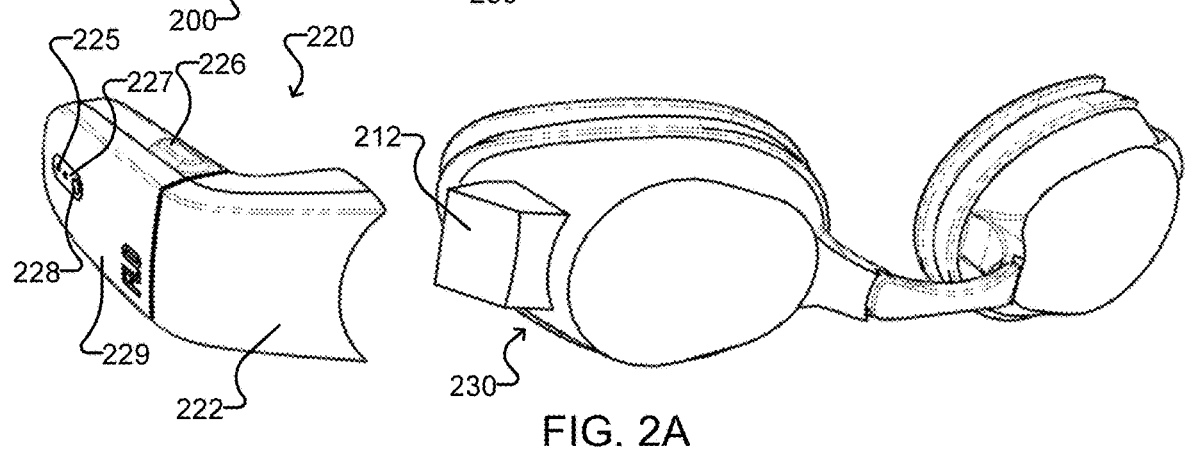
FIG. 2A shows the swimming goggles and HUD system of FIG. 2 with the electronics module of the HUD system separated from the goggles.
Figure 2B:
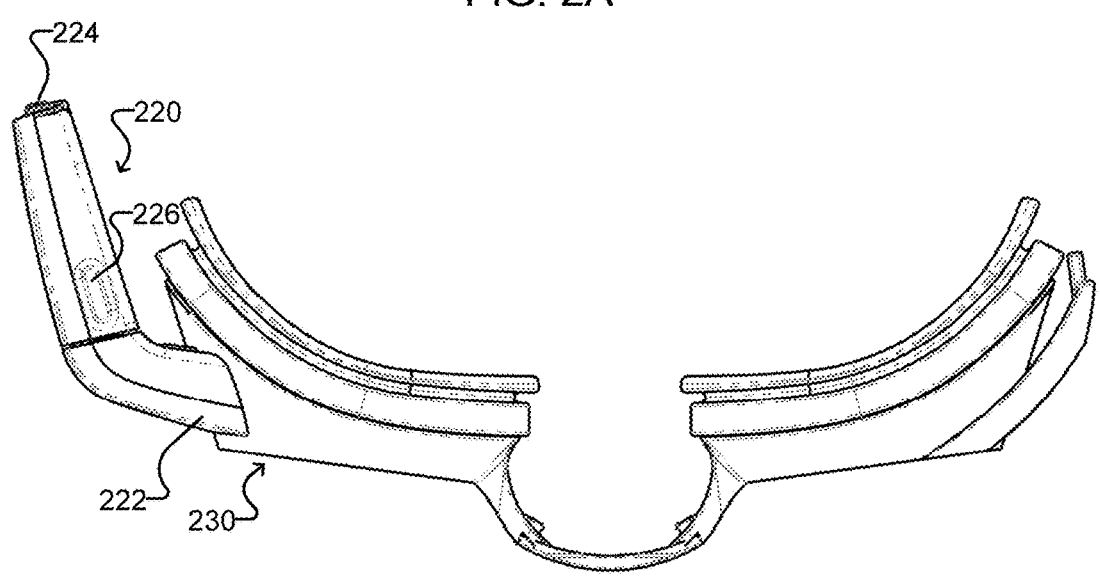
FIG. 2B is a top view of the swimming goggles and HUD system of FIG. 2.

FIGS. 2, 2A and 2B show a pair of swimming goggles G' with an integrated HUD system 200 comprising an electronics module 220 and an optics module 230. In HUD system 200, the optics module 230 is formed within one of the goggles eye cups, and a mounting portion 212 extending laterally outwardly from the eye cup is configured to engage an optical module interface 222 of the electronics module 220. In some embodiments, the electronics module 220 is removable from the goggles G', such that the goggles G' may be provided separately from the electronics module 220, and users can purchase goggles and electronics modules separately.

The electronics module 220 comprises an electronic system having a processor and a plurality of sensors for generating signals indicative of swimming performance data, and a display device for sending light signals to the optics module 230, as described further below. The optics module 230 comprises light directing elements within the eye cup for directing light generated in the electronics module 220 towards the user's eye. Details of an example optics module consisting essentially of a collimating optic, a waveguide, a corrective optic and a cap are described below with reference to FIGS. 4 to 5D. The optics module 230 may take other forms in other embodiments.

As best seen in FIG. 2B, the electronics module 220 also comprises a port 224, such as for example a micro-USB port. In some embodiments, the port 224 comprises an IP68 10 m waterproof Micro-USB connector. This Micro-USB connector is sealed through the body of the connector and has a rubber seal around the outside that seals with a mating port in the housing of the electronics module 220. As an alternative to a waterproof micro-USB connector, the port 224 may, for example, comprise pogo-pin contacts embedded in the wall of the housing of the electronics module 220, and a custom USB cable may be provided for connecting to the pogo-pin contacts. The port 224 allows the HUD system 200 to be connected to a power source for charging the battery, and/or connected to another electronic device for wired data transfer. In other embodiments, the HUD system 200 comprises a wireless charging receiver such that the battery may be charged wirelessly. The electronics module 220 may also comprise one or more user interface elements, which in the illustrated example include a power button 226, a wireless activation button 228, and a touch sensitive region 229. The electronics module 220 may also comprise status indicators 225 (e.g. LEDs) The electronics module 220 may also comprise an ambient light sensor 227 for detecting ambient lighting conditions.

Figure 3:
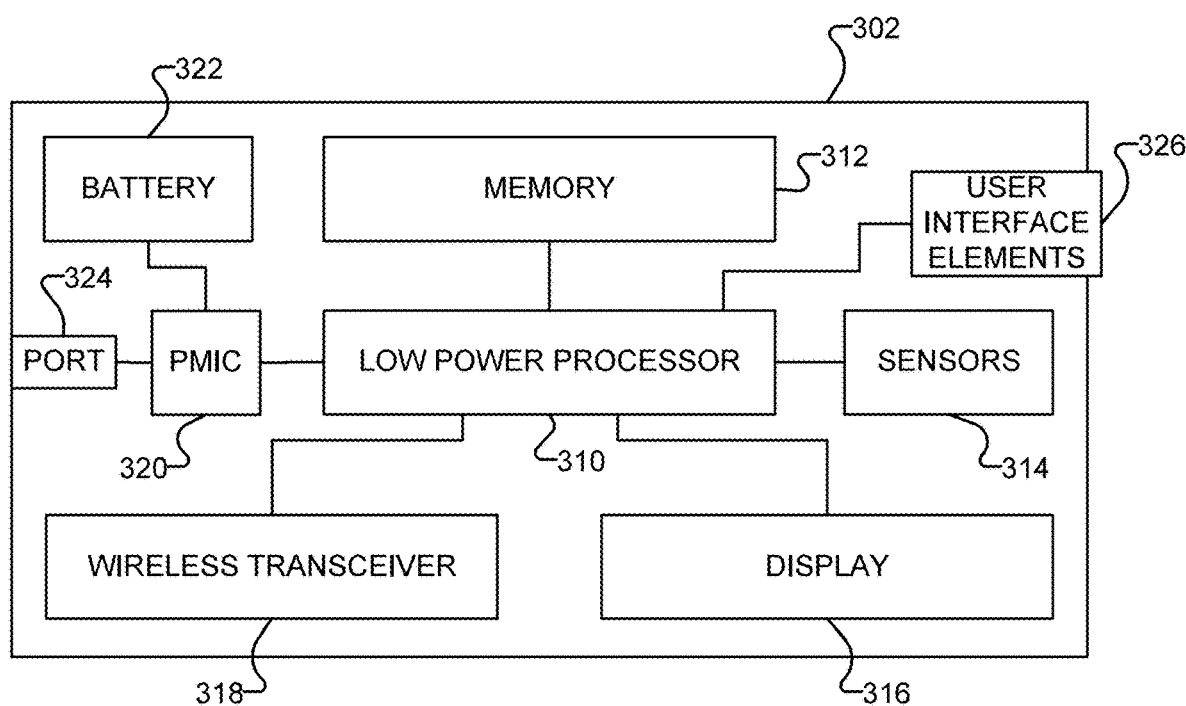
FIG. 3 is a schematic block diagram of an example electronic system for a HUD system according to the present disclosure.

FIG. 3 schematically illustrates elements of an electronic system 300 according to some embodiments of the present disclosure. The electronic system 300 of FIG. 3 may, for example, be incorporated into the electronics module 120/220 of the HUD system 100/200 of FIG. 1 or FIG. 2. Since the electronic system 300 is configured for use in the water, the elements of the system 300 are contained within a watertight housing 302. The connections to the system 300 from outside the housing 302, for example the port 124/224, are waterproof.

The electronic system 300 comprises a low power processor 310, a memory 312, a plurality of sensors 314, a display 316, a wireless transceiver 318, a power management integrated circuit (PMIC) 320, a battery 322, a port interface 324, and one or more switches or other user interface elements 326. The sensors 314 comprise one or more accelerometers and gyroscopes (e.g., a 6-axis accelerometer and gyroscope) for measuring acceleration and rate of turn along and about a plurality of axes. The sensors 314 provide acceleration and rate of turn signals to the processor 310, which processes these signals by execution of computer readable instructions stored in memory 312 to generate swimming performance data. In some embodiments, the memory 312 is able to store 8 hours or more of swimming performance data. In some embodiments, the sensors 314 may include additional sensors, such as for example, an ambient light sensor, a heart rate (HR) sensor, a global positioning system (GPS) sensor, a pressure sensor, a magnetometer, and/or other sensors (e.g. body worn sensors for advanced motion or biometrics detection and analysis). In some embodiments, the electronic system 300 may also receive signals from additional sensors separate from the HUD system 100/200 through the wireless transceiver 318. The processor 310 drives the display 316 to generate light based on the swimming performance data, and light from the display 316 is projected into the optics module 110/210 of the HUD system 100/200 for generating an image viewable by the user containing swimming performance information. The display 316 may comprise a monochrome display, an RGB display, or other type of display. The display 316 may, for example, comprise a low resolution OLED display.

In some embodiments, the processor 310, memory 312, sensors 314, wireless transceiver 318 and PMIC 320 may all be incorporated into a single, low-power module such as, for example the Intel® Curie™ module, or the ST Microelectronics STM32L4. The display 316 may, for example comprise an OLED display with a resolution of 64×32 or 72×40. In some embodiments, the electronic system 300 may interface with a camera (either integrated into the HUD system or provided as a separate accessory) to enable video recording and photos.

The electronic system 300 includes firmware for driving the sensors 314 and software for calculating, storing, exporting/importing and displaying the resulting swimming performance data and related information. In some embodiments, the electronic system 300 is controllable by means of a multi-purpose button of the user interface elements 326 for toggling (one press) and selecting (hold) for setting up, configuring and controlling the electronic system 300. The electronic system 300 may also be paired to or otherwise communicatively coupled to another electronic device (e.g. a smartphone, tablet, computer, etc.) for setting up, configuring and controlling the electronic system 300, for importing and exporting performance data and related information, and/or for interfacing with online platforms (e.g. www.swim.com). For example a user may configure the electronic system 300 for use in pools having different lengths (e.g., 25 meters, 50 meters, custom), to use different measurement units (e.g. meters, yards), to set desired performance metrics or targets and measure actual performance against such targets (such as for example pace, stroke rate, SWOLF (sum of time and stroke count to complete a given distance), calories burned, total swimming time, total swimming distance, total number of laps, workout duration, turn power, turn time, underwater time, number of underwater kicks, etc.), to select the type of performance information displayed to the user, to select the frequency of pop-up messages or other communications displayed to the user. In some embodiments, the electronic system 300 may display pop-up messages to the user based on comparisons of the user's performance to various benchmarks or targets, such as a target pace, target stroke rate, target split time, recent performances, average performance, personal best, etc., or may display messages from an external source (e.g. from an electronic device used by a coach or trainer).

The computation required for delivering many of the described features relies on detection of certain events as determined by the onboard motion sensors (e.g., 6-axis accelerometer and gyroscope). Certain types of events that may be detected by HUD systems according to the present disclosure are listed in the table below.

| Event Detection | |
| --- | --- |
| Event | Description |
| Auto Start Workout | Detects when user is pushing off wall |
| Auto Finish | Used to start/stop activity when swimmer is at rest between swims. Detection occurs either when head is out of water in vertical position and/or when wall finish is detected without immediately turning in opposite direction. |
| Auto Rest Timer | Determines time between touching wall (without flip turn) and pushing off again |
| Detect Swim | Auto detect activity defined as movement between rests. |
| Detect Stroke Type | Auto detect type of swim stroke based on accelerometer and/or gyroscope signals (e.g. free, fly, breast, back, kick, IM, drill (mixed)). |
| Timer | Auto start timer when pushing off wall for swim, stop timer after each swim. |
| Auto split | Split time and distance per swim at each turn for all strokes |
| Distance | Total distance; current swim distance (per lap unit); distance since last turn; distance per stroke |
| Pace | Time per 50 or 100. Pops up after each turn in increments of 50 for all strokes |
| Speed | In a pool, determined based on the time and the number of completed laps plus distance since last turn; in open water, determined based on the time and the average distance per stroke combined with various sensor inputs (e.g. from accelerometer, gyroscope and magnetometer) |

Event Detection

| Event | Description |
| --- | --- |
| Auto split per swimming type at turn (fly, back, crawl, breast, kick) | Accelerometer detects turn automatically and splits clock per distance/laps. In some embodiments, the gyroscope is used in combination to detect the start of a turn and in response control the accelerometer to have a faster sampling rate to detect change in direction of motion and push-off from wall. Gyroscope could also be used alone by calculating the 180 degree angular acceleration from horizontal to horizontal either in z-axis (hand finish) or x-axis (vertical turn). The type of turn varies based on the type of stroke. Back and crawl will be almost identical and so will breast and fly. Kicking finish is unique in that a kickboard is used and usually only one arm touches the wall before turning. |
| Auto lap count | Use Auto Split and Auto Finish algorithms to count laps |
| Auto On | Turns device on when in water. Could be activated when push off from wall is detected or when head is facing down in horizontal position for x seconds. |
| Auto Off | Device turns off when no swims have been started for a given timeframe (e.g. 2 min, configurable by user) and head is not in horizontal position. |
| Stroke count | Counts total strokes and #stroke per minute (accelerometer) |
| Breathing count/breathing rate | Count breaths taken per lap, per swim, per minute, etc. |
| Smart Coach engine | Detects technique during swim and sends feedback to the user with simple tips about things like stroke mechanics, body position, head position, stroke frequency, breathing rate, speed and fatigue. Use sensors to pick up approximate body and head position compared to ideal, and changes in body and head position. Also detects when head is moved to the side for breathing, when hands enters the water and exits and changes in drag by inferring incorrect technique to changes in speed. Body worn sensors can be worn to improve accuracy and provide extra data points for this analysis. |

In some embodiments, the electronics system 300 is configured to determine a current pace based on acceleration signals from the one or more sensors, determine an expected interval finish time based on the current pace, and display the expected interval finish time to the user in real time. In some embodiments, the electronics system 300 is configured to determine a distance travelled and display the distance travelled in the image in real time. In some embodiments, the electronics system 300 is configured to determine a swimming speed and display the swimming speed in the image in real time.

In some embodiments, the electronics system 300 is configured to determine a stroke type based on acceleration signals from the one or more sensors, compare a detected stroke profile to an ideal stroke profile for the determined stroke type, and display real time stroke technique feedback to the user in real time. The electronic system 300 may also send feedback regarding other performance metrics. For example, the electronic system 300 may detect a user's performance and technique during swimming and send feedback to the user with tips about things like stroke mechanics, body position, head position, stroke frequency, breathing behavior, speed, fatigue, kicking pattern, actual location in pool (e.g. right before/after turn) etc. In some embodiments, the electronic system 300 may store a variety of feedback messages and automatically display messages to the swimmer in response to certain triggering events. For example, when the system 300 detects that a swimmer's head is coming up too high, a message such as "keep your head down" could be displayed.

In some embodiments, the electronic system 300 is configured to determine a turn score based on a swimmer's resulting speed when coming off of a turn. This speed is a function of the power with which the swimmer pushes off the wall, and how streamlined the swimmer is after the turn. In some embodiments, the electronic system 300 is configured to determine an underwater score based on what the swimmer does after a turn. Good swimmers use dolphin kicks to propel themselves underwater avoiding waves from other swimmers in adjacent lanes and leveraging momentum from turn before resurfacing. The electronic system 300 may determine the underwater score based on how streamlined the swimmer is and effectiveness of dolphin kicks. The maximum allowed distance underwater is 15 meters so the electronic system 300 may be configured to display a warning to the swimmer prior to the swimmer travelling 15 meters underwater (e.g., at 10, 11, 12, 13, and/or 14 meters).

In some embodiments, the electronic system 300 provides a user in an open water swim with waypoint heading and position indicators (e.g., by displaying waypoint markers and/or arrows in the image) based on GPS signals. For example, in an example embodiment providing open water waypoint navigation, a swimmer looks at the first buoy on the course and provides user input to the HUD system (e.g. the user double taps the goggles or presses a button on the HUD system) to set course. The electronic system 300 controls the display 316 to show swimmer if he/she is veering off track and direct him/her back on straight line. Some embodiments may provide for automatic navigation, where the swimmer simply swims straight for e.g. 10 meters and the HUD system determines the current direction as a desired heading and provides visual feedback to keep the swimmer on track. For the first leg the swimmer already has the right course as he/she just looked straight at the first Buoy before jumping in. For subsequent legs of the open water swim, the swimmer just has to look up once to determine the right direction to swim in, then the HUD system provides visual feedback helping him/her stay on track.

In some embodiments, the electronic system 300 receives heart rate (HR) signals and compares the HR signals to a current pace, stroke rate or other performance metric to provide the user with feedback on their current effort level.

In addition to the features and event detection provided by on-board processing capabilities of the HUD system, some embodiments of the present disclosure also provide additional functionality through processing capabilities remote from the HUD system, such as on a server system or the like. For example, in some embodiments a server system is configured for wireless communication with one or more HUD systems. The server system may be configured to collect swimming performance data from a "Smart Coach engine" feature of the HUD system for each user in a community (e.g., a swim team, swim club or the like) and perform regression analysis to determine correlation between speed, effort and technique. This analysis can then be used by the server system to provide tips during swimming for everyone tailored to individual skill level by sending data to their respective HUD systems. The server system may collect data from swimmers on the platform correlating all the metrics collected from the Smart Coach engine and using it to provide optimized recommendations for technique correction to reduce drag and increase stroke and kick effectiveness to teach swimmers of all levels to become better and faster through tips displayed in the image in real time that fit their skillset at the time.

Figure 4:
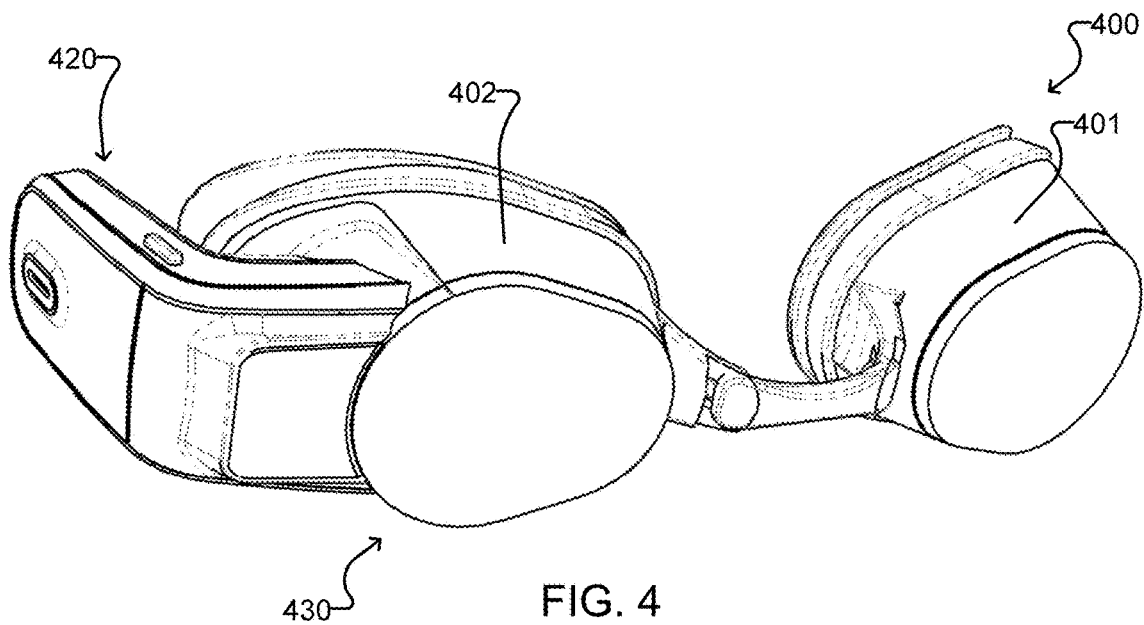
FIG. 4 shows a pair of swimming goggles with an integrated HUD system with an optics module integrated into one of the eye cups.
Figure 4A:
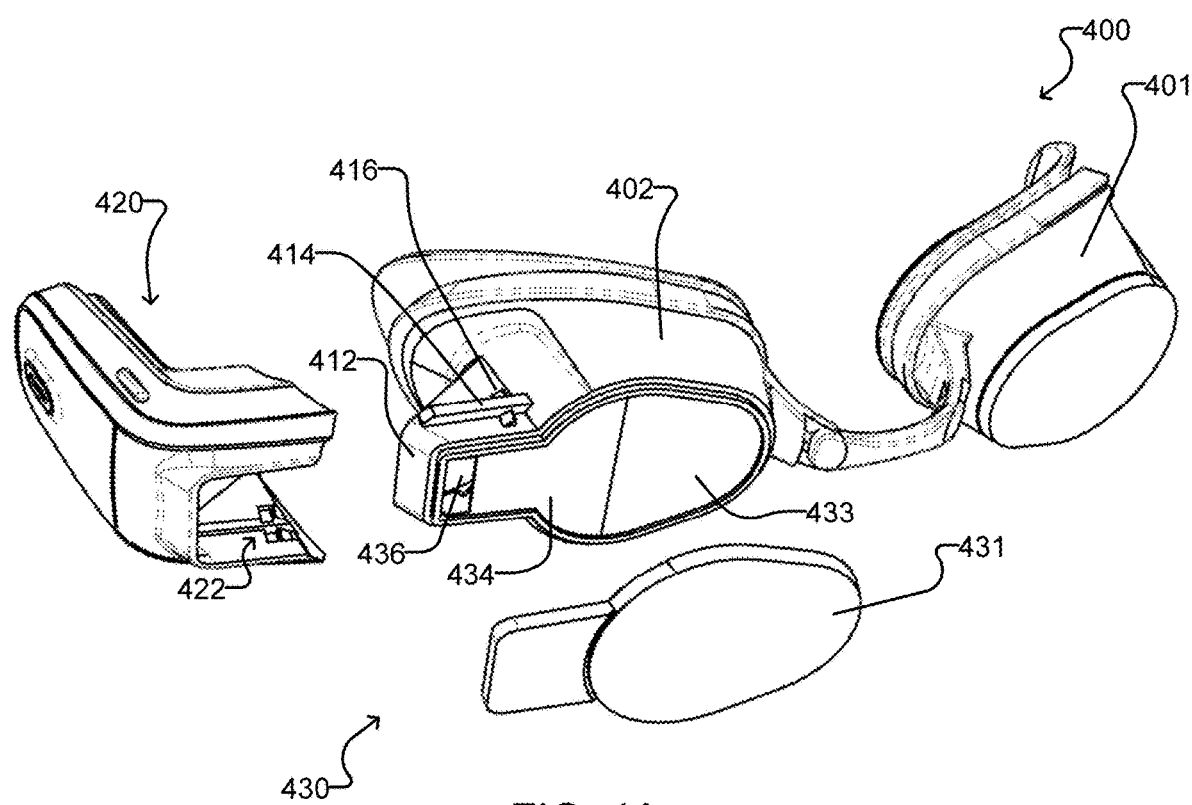
FIG. 4A shows the swimming goggles and HUD system of FIG. 4 with the electronics module of the HUD system and the optical module cap separated from the goggles.

FIGS. 4 and 4A show a pair of goggles 400 with eye cups 401 and 402 having a HUD system that includes an electronics module 420 and an example optical system 430 integrated into the eye cup 402 according to one embodiment of the present disclosure. The other eye cup 401 may be substantially similar to a standard goggle eye cup. The electronics module 420 comprises an electronic system (e.g. electronic system 300 of FIG. 3) having a processor and a plurality of sensors for generating signals indicative of swimming performance data, and a display device for sending light signals to the optics module 430. The electronics module 420 may be substantially similar to electronics module 220 described above with reference to FIGS. 2, 2A and 2B. As described further below, the optics module 430 comprises a cap 431, a corrective optic 433, a waveguide 434 and a collimating optic 436.

Eye cup 402 has a mounting portion 412 thereon extending laterally outwardly therefrom to engage an interface portion 422 of the electronics module 420 and accommodate portions of the optics module 430. In the illustrated example, the mounting portion 412 has an elongated protrusion 414 and angled protrusions 416 on the top and bottom surfaces thereof, and the interface portion 422 of the electronics module 420 has correspondingly-shaped recesses to receive the protrusions 414/416, such that the electronics module 420 can be slid onto the mounting portion 412 and will held in place once the protrusions 414/416 are received in the recesses in the interface portion 422. In some embodiments, the interface portion 422 of the electronics module forms a watertight seal around the mounting portion 412 of the eye cup 402.

Figure 5:
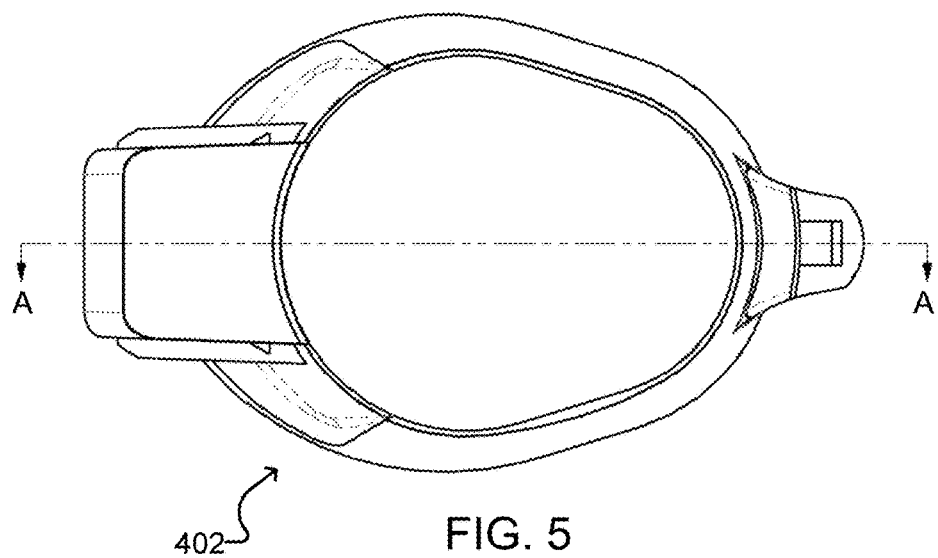
FIG. 5 shows the eye cup having the integrated optics module of the goggles of FIG. 4 in isolation.
Figure 5A:
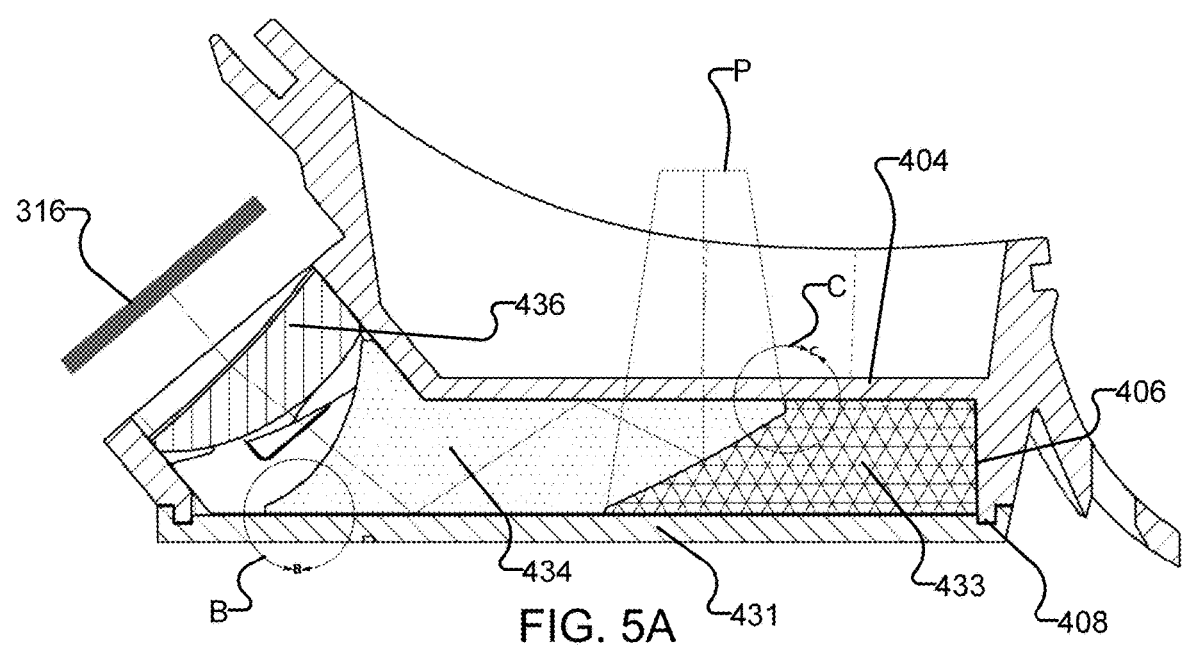
FIG. 5A is a sectional view along line A-A of FIG. 5.
Figures 5B, 5C:
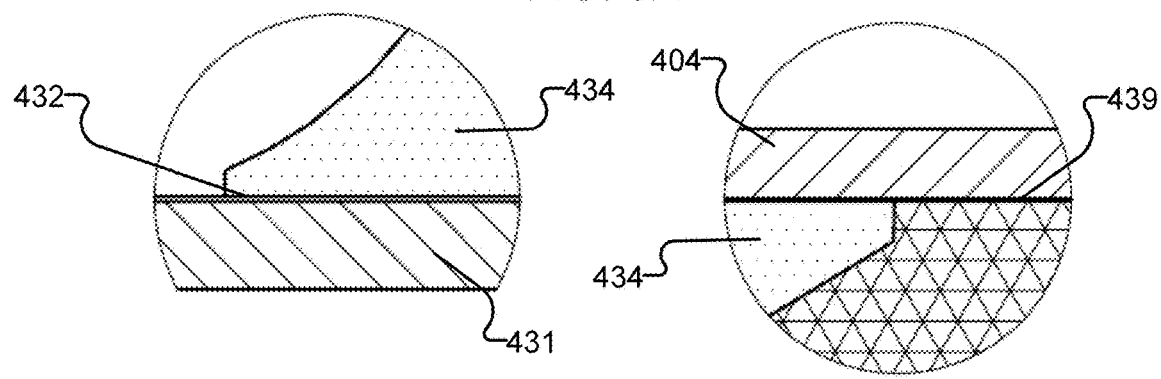
FIG. 5B is an enlarged view of the area indicated by circle B in FIG. 5A.
FIG. 5C is an enlarged view of the area indicated by circle C in FIG. 5A.
Figure 5D:
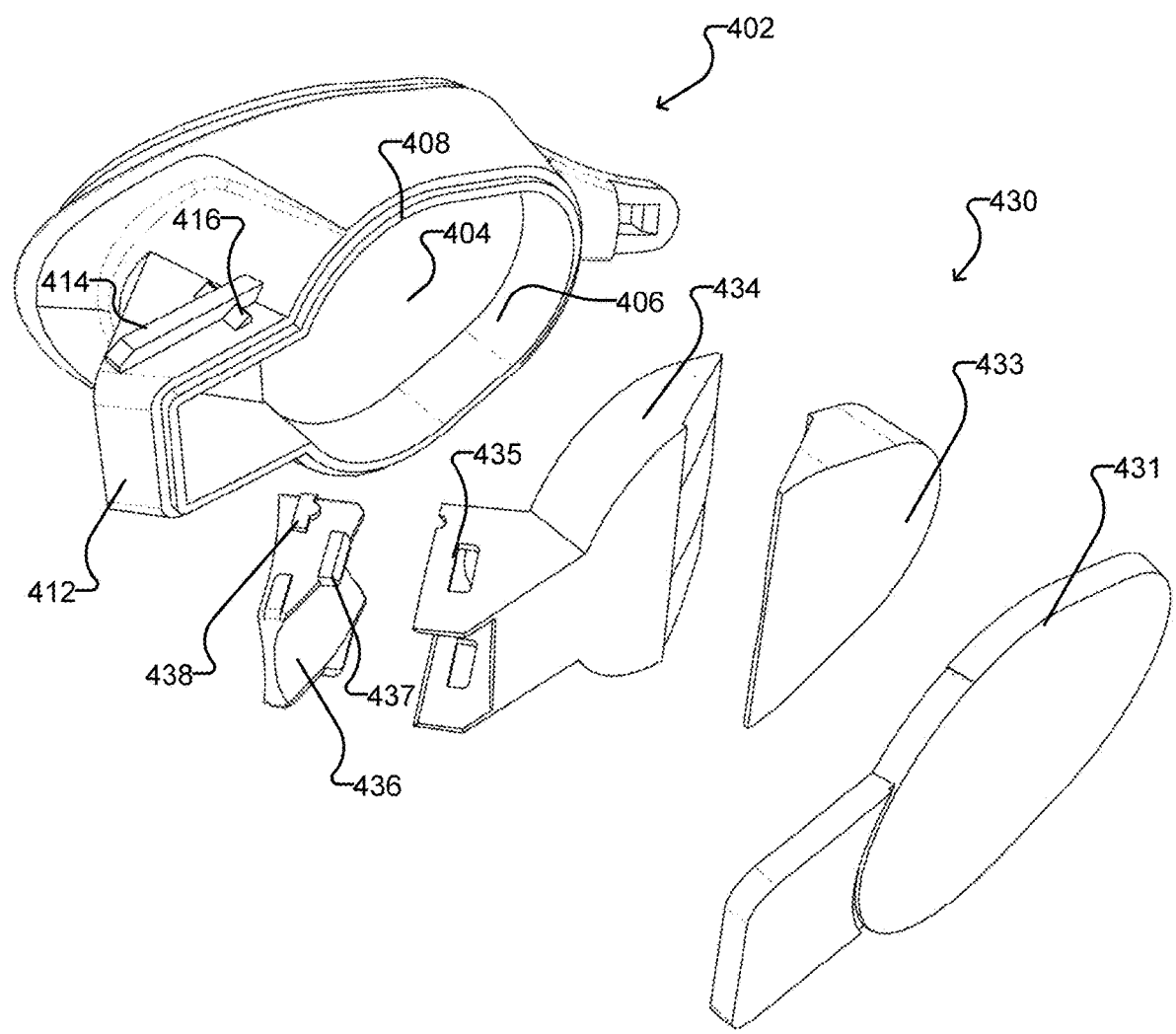
FIG. 5D is an exploded view of the eye cup of FIG. 5.

FIGS. 5, 5A, 5B, 5C and 5D show details of the eye cup 402 and optics module 430 of the example embodiment of FIG. 4. As best seen in FIGS. 5A and 5D, the eye cup 402 has an inner wall 404, with a flange 406 extending forwardly from around a periphery thereof. A lip 408 is provided extending forwardly from around the inner edge of the flange 406 and a forward facing portion of the mounting portion 412. The cap 431 has a groove (not separately enumerated) on the rear face thereof for engaging with the lip 408. The corrective optic 433 and waveguide 434 are held captive between the cap 431 and the inner wall 404. A beam splitter surface (not separately enumerated) is defined by the interface of the corrective optic 433 and waveguide 434. The waveguide 434 has a pair of flanges extending outwardly and rearwardly therefrom sized to fit around the collimating optic 436 and having apertures 435 for receiving protrusions 437 on the collimating optic 436 to maintain a desired spacing between the waveguide 434 and the collimating optic 436. The collimating optic 436 also has protrusions 438 thereon for holding the collimating optic 436 in place within the mounting portion 412 of the eye cup 402. In some embodiments, a watertight seal is formed between the collimating optic 436 and the mounting portion 412 of the eye cup 402.

In some embodiments, the front and back surfaces of the corrective optic 433 are parallel to each other, and the front and back surfaces of the waveguide 434 are also parallel to each other. In the illustrated example, the front surface of the corrective optic 433 and the front surface of the waveguide 434 are co-planar and separated from the cap 431 by a gap 432, as shown in FIG. 5B, and the rear surface of the corrective optic 433 and the rear surface of the waveguide 434 are co-planar and separated from the inner wall 404 by another gap 439. In some embodiments, each of the gaps 432 and 439 has a size of about 0.1 mm. The gaps 432 and 439 may be maintained by spacer material around a periphery of the waveguide 434, or by any other suitable structural features. The gap 432 and 439 allow for total internal reflection of light from the display 316 within the waveguide 434, as discussed below. In some embodiments, the gaps 432 and 439 are only present at the front and back surfaces of the waveguide 434 and not at the front and back surfaces of the corrective optic 433. However, providing gaps 432 and 439 at the front and back surfaces of both the waveguide 434 and corrective optic 433 advantageously minimizes optical distortions in some embodiments. In some embodiments, the gaps 432 and 439 are filled with air. In some embodiments, the gaps 432 and 439 are filled with argon or another suitable gas. In some embodiments, the eye cup 402, cap 431, corrective optic 433 and waveguide 434 are all formed from optically transparent polycarbonate, and the collimating optic is formed from poly(methyl methacrylate) (PMMA). In some embodiments, the optical module 430 is affixed to the eye cup 402 by means of ultrasonic welding, without the use of glues or adhesives. For example, in some embodiments, an ultrasonic weld may be formed between the lip 408 of the flange 406 of eye cup 402 and the cap 431.

When the electronics module 420 is in place, the display 316 is about 4 mm from an entry freeform surface of the collimating optic 436. Light from the display 316 is collimated by the collimating optic 436 and exits form an exit freeform surface thereof and enters through an entry freeform surface of the waveguide 434. The light is then totally internally reflected off the front surface of the waveguide 434, the rear surface of the waveguide 434, and then partially reflected by the beam splitter surface at the interface of the waveguide 434 and the corrective optic 433 to be directed to a pupil aperture P. In some embodiments, an image from the display 314 redirected through the optics module 430 to the pupil aperture P subtends a 20 degree horizontal angle at the pupil aperture P. In some embodiments, the beam splitter surface at the interface of the waveguide 434 and the corrective optic 433 may be a freeform surface configured to magnify an image from the display 314 after the image has passed through the collimating optic 436.

To reduce optical distortion, in some embodiments the collimating optic 436 is tilted with respect to the optical axis of the optical module 430. In some embodiments, the two freeform surfaces of the collimating optic 436 can also be independently tilted in order to reduce aberrations such as field curvature, distortion, and axial and lateral color aberrations, some of which are introduced by the off-axis configuration of the beam splitter surface at the interface of the waveguide 434 and the corrective optic 433. By utilizing freeform surfaces, as well as tilting the collimating optic 436, the total number of lenses required to form an image can be reduced, thus reducing the cost, complexity and weight of the optics module 430 and HUD system 400.

In some embodiments, the optics module 430 comprises a holographic waveguide held in place between the cap 431 and the inner wall 404 to maintain a gap between the waveguide and the cap 431. One or more lenses (e.g. a freeform optic lens similar to the collimating optic 436) may be provided between the display 316 and the holographic waveguide.

The present disclosure may be embodied in other specific forms without departing from its spirit or essential characteristics. The described embodiments are to be considered in all respects only as illustrative and not restrictive.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. For example:

the optical module 430 of FIGS. 4-5D could be integrated into the embodiments of FIG. 1 or FIG. 2;

the optical module 430 of FIGS. 4-5D could have additional collimating optics or other optical elements;

the optical elements may be tilted or decentered with respect to each other, or be of different materials;

the optical surfaces of the optical module 430 may be freeform, aspheric, radially-symmetric, or any other type of optical surface.

It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of certain embodiments may include a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only

The invention claimed is:

1. A heads up display (HUD) system configured for use with a pair of swimming goggles comprising first and second eye cups, a nose bridge connected to an inner side of each of the first and second eye cups, and a strap mounting portion on an outer side of each of the first and second eye cups, the HUD system comprising:

an electronics module comprising a water tight housing and a processor, memory, power supply, one or more sensors and a display within the water tight housing, wherein the processor processes signals from the one or more sensors to determine swimming performance data and controls the display to generate an image containing the swimming performance data; and an optics module integrated into one of the first and second eye cups, the optics module including:

a collimating optic along an optical axis of the display, the collimating optic having a first freeform surface facing the display and a second freeform surface facing away from the display;

a waveguide having a third freeform surface facing the second freeform surface, opposed front and back surfaces at obtuse angles to an optical axis of the third freeform surface, and a beam splitter surface between the opposed front and back surfaces; and a corrective optic having a beam splitter surface conforming to the beam splitter surface of the waveguide, and having opposed front and back surfaces co-planar with the front and back surfaces of the waveguide;

wherein the optics module is coupled to the electronics module for receiving the image from the display, the optics module extending from the electronics module and having one or more light directing features for redirecting the image toward an eye of a user to generate a redirected image.

2. The HUD system of claim 1 wherein the one of the first and second eye cups comprises a mounting portion adapted to receive the electronics module.

3. The HUD system of claim 1 wherein the one of the first and second eye cups comprises an inner wall, and a flange extending outwardly from around a periphery of the inner wall to define a cavity for the optical module, wherein the optical module comprises a cap attached to the flange, and wherein the waveguide is held captive between the cap and the inner wall with a first gap between the front surface of the waveguide and the cap and a second gap between the back surface of the waveguide and the inner wall.

4. The HUD system of claim 3 wherein the cap is ultrasonically welded to the flange.

5. The HUD system of claim 1 wherein the electronics module is configured to determine a current pace based on acceleration signals from the one or more sensors, determine an expected interval finish time based on the current pace, and display the expected interval finish time in the image in real time.

6. The HUD system of claim 5 wherein the electronics module stores a plurality of pre-recorded feedback messages, and is configured to display one of the pre-recorded feedback messages in the image in response to detecting a triggering event in the swimming performance data.

7. The HUD system of claim 6 wherein the electronics module is configured to determine a stroke type based on acceleration signals from the one or more sensors, compare a detected stroke profile to an ideal stroke profile for the determined stroke type to generate stroke technique feedback, and display the stroke technique feedback in the image in real time.

8. The HUD system of claim 7 wherein the electronics module is configured to determine a distance travelled and display the distance travelled in the image in real time.

9. The HUD system of claim 8 wherein the electronics module is configured to determine a distance travelled and display the distance travelled in the image in real time.

10. The HUD system of claim 9 wherein the electronics module is configured to determine an underwater distance travelled and display a warning in the image when the underwater distance travelled approaches a maximum allows underwater distance.

11. The HUD system of claim 10 wherein the electronics module comprises a GPS sensor and is configured to display waypoint position and heading indicators in the image based on GPS signals.

12. The HUD system of claim 11 wherein the electronics module is configured to automatically determine a current swimming direction and display heading indicators in the image to alert the user of deviations from the current swimming direction.

13. A pair of swimming goggles comprising first and second eye cups, a nose bridge connected to an inner side of each of the first and second eye cups, a strap mounting portion on an outer side of each of the first and second eye cups, and a heads up display (HUD) system integrated into one of the first and second eye cups, the HUD system comprising:

an electronics module comprising a water tight housing and a processor, memory, power supply, one or more sensors and a display within the water tight housing, wherein the processor processes signals from the one or more sensors to determine swimming performance data and controls the display to generate an image containing the swimming performance data; and an optics module mounted on one of the first and second eye cups, the optics module including:

a collimating optic along an optical axis of the display, the collimating optic having a first freeform surface facing the display and a second freeform surface facing away from the display;

a waveguide having a third freeform surface facing the second freeform surface, opposed front and back surfaces at obtuse angles to an optical axis of the third freeform surface, and a beam splitter surface between the opposed front and back surfaces; and a corrective optic having a beam splitter surface conforming to the beam splitter surface of the waveguide, and having opposed front and back surfaces co-planar with the front and back surfaces of the waveguide;

wherein the optics module is coupled to the electronics module for receiving the image from the display, the optics module extending from the electronics module and having one or more light directing features for redirecting the image toward an eye of a user to generate a redirected image.

14. The pair of swimming goggles of claim 13 wherein the one of the first and second eye cups comprises an inner wall, and a flange extending outwardly from around a periphery of the inner wall to define a cavity for the optical module, wherein the optical module comprises a cap attached to the flange, and wherein the waveguide is held captive between the cap and the inner wall with a first gap between the front surface of the waveguide and the cap and a second gap between the back surface of the waveguide and the inner wall.

15. A heads up display (HUD) system configured for use with a pair of swimming goggles comprising first and second eye cups, a nose bridge connected to an inner side of each of the first and second eye cups, and a strap mounting portion on an outer side of each of the first and second eye cups, the HUD system comprising:

an electronics module comprising a water tight housing and a processor, memory, power supply, one or more sensors and a display within the water tight housing, wherein the processor processes signals from the one or more sensors to determine swimming performance data and controls the display to generate an image containing the swimming performance data;

an optics module mounted on one of the first and second eye cups, the optics module coupled to the electronics module for receiving the image from the display, the optics module extending from the electronics module and having one or more light directing features for redirecting the image toward an eye of a user to generate a redirected image; and the optics module including a transparent portion having a viewing surface configured for placement against a front side of one of the first and second eye cups, and one or more protrusions extending from each of a top side and a bottom side of the transparent portion; and one or more resilient loop members configured to be stretched around the nose bridge, the strap mounting portion of one of the first and second eye cups, and the one or more protrusions on the top side and the bottom side of the transparent portion for removably securing the HUD system to one of the first and second eye cups.

16. The HUD system of claim 15 wherein the one or more protrusions on each of the top side and the bottom side of the transparent portion extend from an edge of the transparent portion adjacent to the viewing surface.

17. The HUD system of claim 16 wherein the one or more protrusions on each of the top side and the bottom side of the transparent portion comprise a flange extending outwardly from an edge of the transparent portion adjacent to the viewing surface, and a hook at an end of the flange closest to the electronics module.

\* \* \* \* \*